(12) United States Patent
Kim et al.

(10) Patent No.: US 8,652,667 B2
(45) Date of Patent: Feb. 18, 2014

(54) BATTERY PACK

(75) Inventors: Heongsin Kim, Yongin-si (KR); Youngcheol Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 485 days.

(21) Appl. No.: 12/633,573

(22) Filed: Dec. 8, 2009

(65) Prior Publication Data

US 2010/0143753 A1 Jun. 10, 2010

(30) Foreign Application Priority Data

Dec. 10, 2008 (KR) ................... 10-2008-0125263

(51) Int. Cl.
| | |
|---|---|
| *H01M 10/34* | (2006.01) |
| *H01M 14/00* | (2006.01) |
| *H01M 10/52* | (2006.01) |
| *H01M 2/00* | (2006.01) |
| *H01M 10/50* | (2006.01) |
| *H01M 2/02* | (2006.01) |

(52) U.S. Cl.
USPC ....... 429/57; 429/7; 429/61; 429/62; 429/178

(58) Field of Classification Search
USPC ............................. 429/57, 61, 149, 7, 62, 178
See application file for complete search history.

(56) References Cited

U.S. PATENT DOCUMENTS

| | | | | |
|---|---|---|---|---|
| 6,805,998 | B2 * | 10/2004 | Jenson et al. | ................ 429/162 |
| 2003/0015285 | A1 * | 1/2003 | Iwamoto et al. | ............. 156/325 |
| 2006/0261960 | A1 | 11/2006 | Haraguchi et al. | |
| 2006/0263650 | A1 | 11/2006 | Haraguchi et al. | |
| 2007/0072014 | A1 * | 3/2007 | Kim et al. | ......................... 429/7 |
| 2008/0254359 | A1 * | 10/2008 | Byun et al. | .................... 429/163 |

FOREIGN PATENT DOCUMENTS

| | | |
|---|---|---|
| JP | 2000-090906 | 3/2000 |
| JP | 2008-542996 | 11/2008 |
| JP | 2009-146879 | 7/2009 |
| KR | 10-2006-0068119 | 6/2006 |
| KR | 10-2006-0098712 | 9/2006 |
| KR | 10-2008-0032912 | 4/2008 |
| KR | 20-2008-0000393 | 4/2008 |
| WO | WO 2006/112627 A1 | 10/2006 |

OTHER PUBLICATIONS

European Search Report dated Mar. 19, 2010, for corresponding European Patent application 09252766.2.

Patent Abstracts of Japan, and English machine translation of Japanese Publication 2000-090906 listed above, (14 pages).

SIPO Office action dated Nov. 15, 2012, for corresponding Chinese Patent application 200910253539.7, with English translation, (11 pages).

* cited by examiner

*Primary Examiner* — Patrick Ryan
*Assistant Examiner* — Julian Anthony
(74) *Attorney, Agent, or Firm* — Christie, Parker & Hale, LLP (57) ABSTRACT

A battery pack includes a bare cell; a circuit module on the bare cell and electrically connected to the bare cell; a loop antenna attached to the bare cell and electrically connected to the circuit module; and a PTC device on the loop antenna and electrically connected to the circuit module.

11 Claims, 9 Drawing Sheets

BATTERY PACK

CROSS-REFERENCE TO RELATED APPLICATION

This application claims priority to and the benefit of Korean Patent Application No. 10-2008-0125263 filed on Dec. 10, 2008, the entire content of which is incorporated herein by reference.

BACKGROUND OF THE INVENTION

1. Field of the Invention

The present invention relates to a battery pack.

2. Description of the Related Art

A lithium secondary battery may be fabricated in the form of a battery pack. The battery pack may include a bare cell composed of an electrode assembly having a positive electrode plate, a negative electrode plate and a separator, a can for housing the electrode assembly, and a cap assembly for sealing an open upper part of the can. The battery pack may also include a circuit module having circuit elements such as charge/discharge devices and protection circuit devices connected to the bare cell; and an external cover connected to the bare cell and covering the circuit module.

The lithium secondary battery generally employs protection circuit devices such as positive temperature coefficient (PTC) devices, thermal fuses, and the like. These PTC devices and thermal fuses are typically secondary protection devices, separate from and in addition to the separator which is a primary protection device furnished in the bare cell. The secondary protection device is electrically connected to a charge/discharge circuit of the bare cell to thereby interrupt a flow of electrical current to the outside when the battery pack rises to a threshold temperature or when a disturbance of a preset voltage occurs due to excessive charge/discharge or the like. That is, the secondary protection device serves to prevent explosive rupture of the battery pack.

In a conventional battery pack, the circuit module is installed with the secondary protection device in conjunction with the inclusion of a lead plate for electrical connection between the secondary protection device and the bare cell, thereby requiring a space for mounting of the secondary protection device and the lead plate in the circuit module. As a consequence, there are limitations associated with the installation of numerous circuit elements in the circuit module. Therefore, the circuit module requires a circuit board having a multilayered circuit pattern therein, which disadvantageously leads to increased production costs of the battery pack.

Further, in a typical conventional battery pack, the secondary protection device is connected through the circuit module to the bare cell, which may result in low heat transfer efficiency from the bare cell to the secondary protection device. For this reason, the conventional secondary protection device suffers from deterioration of reliability for preventing the risk of battery pack rupture.

SUMMARY OF THE INVENTION

In accordance with one embodiment of the present invention, a battery pack includes a PTC device in a portion of a loop antenna connected to one side of a bare cell and is therefore capable of providing secured mounting space of circuit elements in a circuit module, minimized design constraints associated with the thickness and width of the battery pack to which the bop antenna is applied, and improved reliability for preventing the rupture of the battery pack.

A battery pack includes a bare cell; a circuit module on the bare cell and electrically connected to the bare cell; a loop antenna attached to the bare cell and electrically connected to the circuit module; and a PTC device on the bop antenna and electrically connected to the circuit module.

In one embodiment, the loop antenna includes a first coverlay; an antenna pattern extending along edges of the first coverlay; a first antenna lead plate and a second antenna lead plate connected to the antenna pattern; and a second coverlay covering the antenna pattern, connected to the first coverlay and attached to one side of the bare cell. The first antenna lead plate may include a first base portion connected to a first end of the antenna pattern and a first extension portion extending at an angle from the first base portion, and the second antenna lead plate may include a second base portion connected to a second end of the antenna pattern and a second extension portion extending at an angle from the second base portion.

The PTC device may be between the bare cell and the circuit module, between the first coverlay and the second coverlay, or on an outside of the antenna pattern. Additionally, the PTC device may include conductive particles dispersed in a crystalline polymer. In one embodiment, the PTC device includes a PTC body between the first coverlay and the second coverlay; a first PTC lead plate connected to a first surface of the PTC body; and a second PTC lead plate connected to a second surface of the PTC body.

Further, the first PTC lead plate may include a first contact portion in contact with a first surface of the PTC body, a first connection portion extending from the first contact portion, and a first extension portion extending at an angle from the first connection portion, and a second contact portion in contact with a second surface of the PTC body, a second connection portion extending from the second contact portion, and a second extension portion extending at an angle from the second connection portion.

In one embodiment, the circuit module includes an antenna connection pad and a PTC connection pad on a lower surface of the circuit module, wherein the antenna connection pad includes a first antenna connection pad and a second antenna connection pad connected to the first extension portion of the first antenna lead plate and to the second extension portion of the second antenna lead plate, respectively, and wherein the PTC connection pad includes a first PTC connection pad and a second PTC connection pad connected to the first extension portion of the first PTC lead plate and to the second extension portion of the second PTC lead plate, respectively.

The battery pack may also include an electromagnetic shielding tape between the bare cell and the second coverlay. The electromagnetic shielding tape may include a receiving groove adapted to generally correspond to the PTC device. Further, the circuit module may include an external terminal portion wherein the external terminal portion includes a power terminal electrically connected to the PTC device and an antenna terminal electrically connected to the loop antenna.

BRIEF DESCRIPTION OF THE DRAWINGS

FIG. 1b is an exploded perspective view of the battery pack shown in FIG. 1a.

FIG. 6b is an exploded perspective view of the battery pack shown in FIG. 6a.

DETAILED DESCRIPTION

Now, embodiments of the present invention will be described in more detail with reference to the accompanying drawings.

Figure 1A:
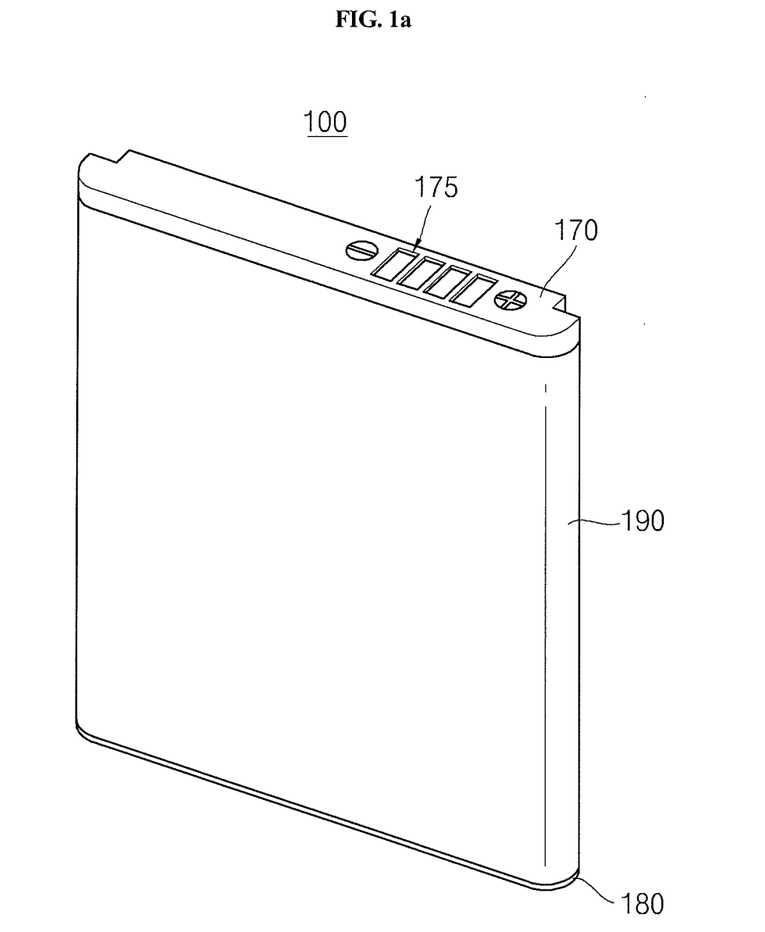
FIG. 1a is a perspective view of a battery pack in accordance with one embodiment of the present invention.
Figure 1B:
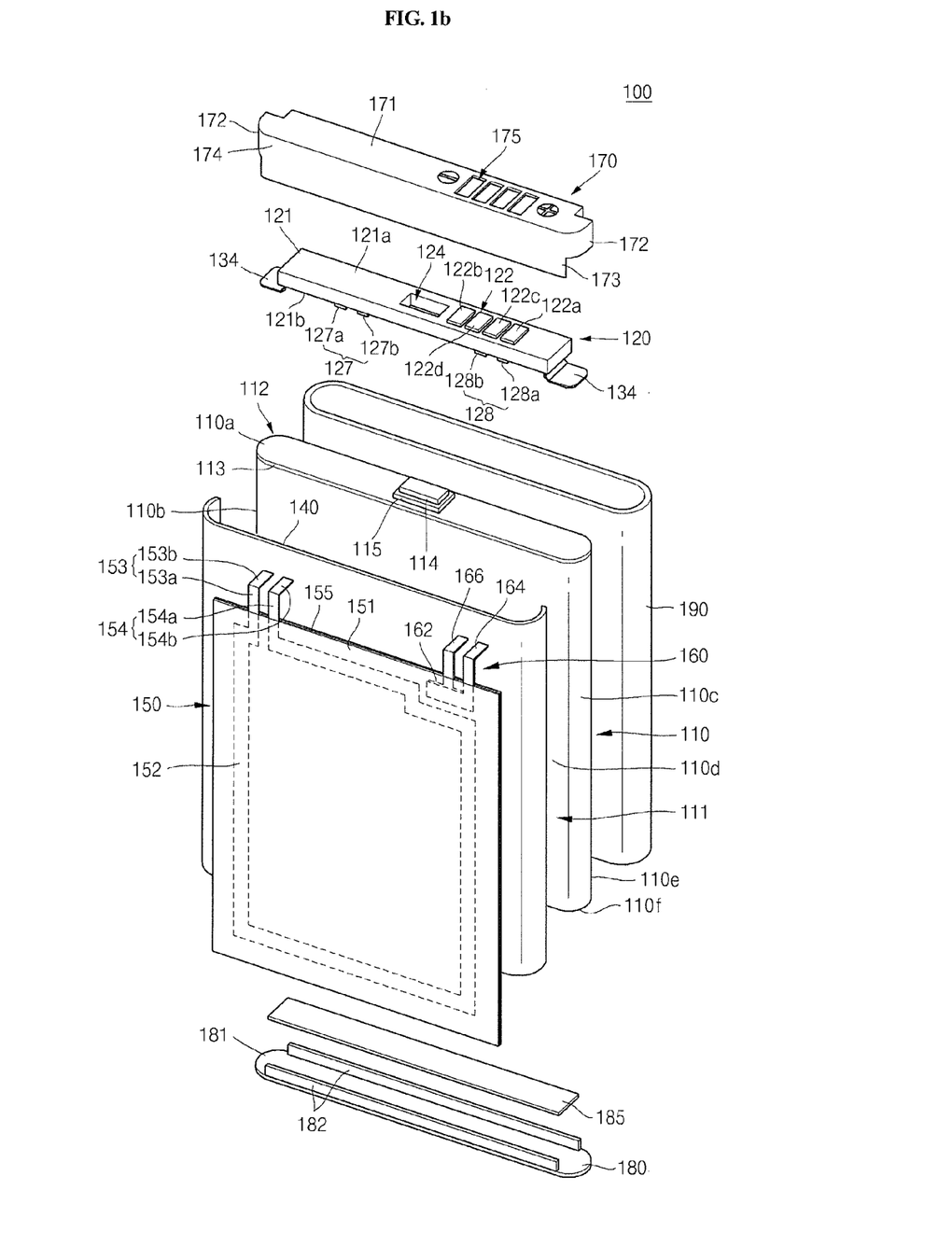
Figure 2:
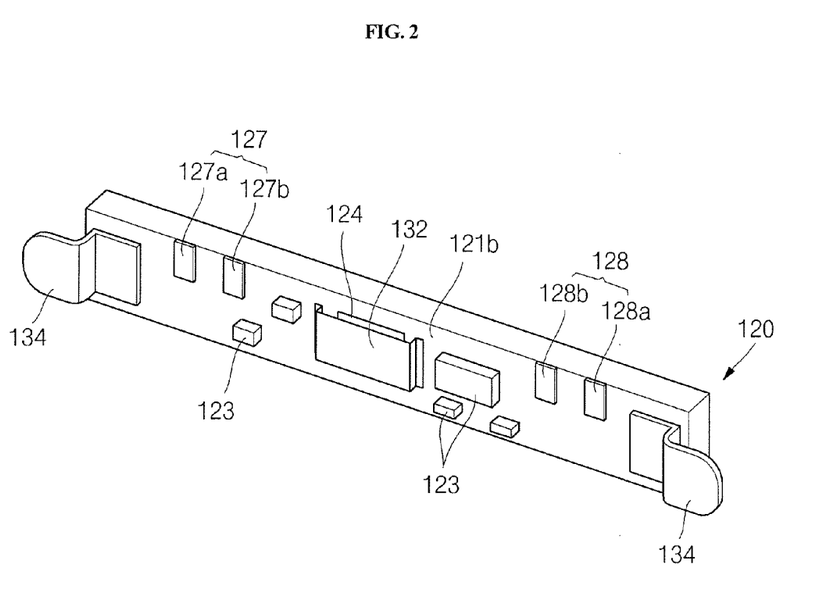
FIG. 2 is a bottom perspective view of a circuit module of the battery pack shown in FIG. 1b.
Figure 3:
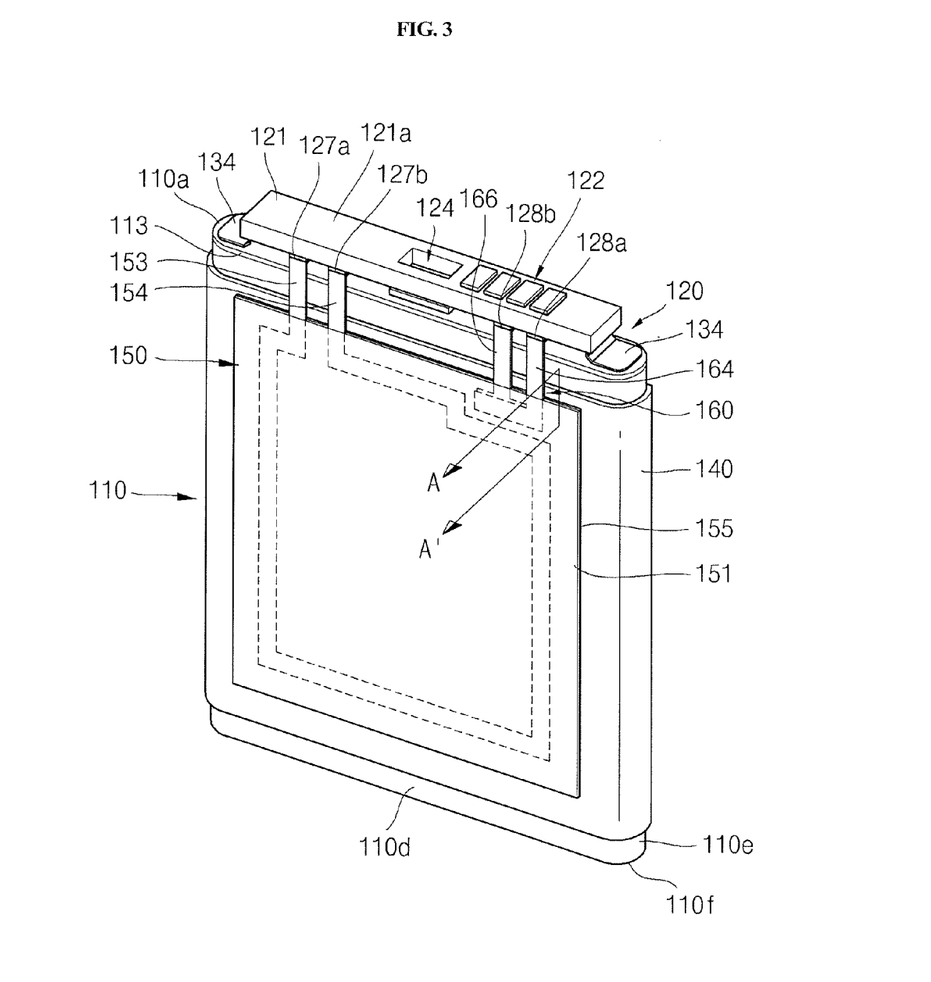
FIG. 3 is a perspective view of a bare cell, a circuit module, a bop antenna and a PTC device of the battery pack shown in FIG. 1b.
Figure 4:
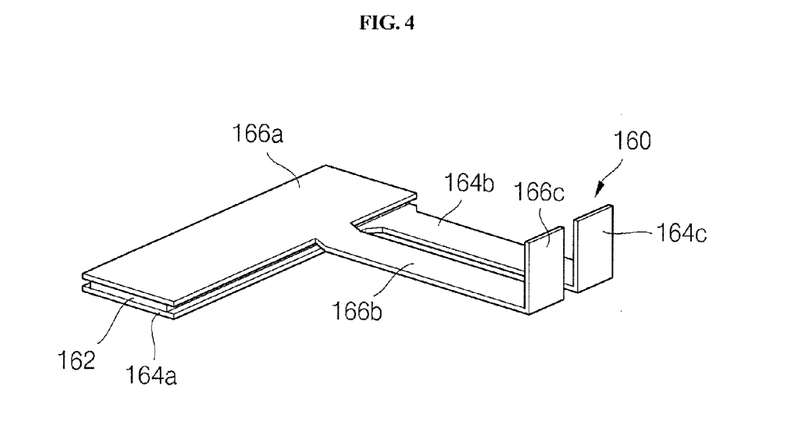
FIG. 4 is a perspective view of a PTC device shown in FIG. 3.
Figure 5:
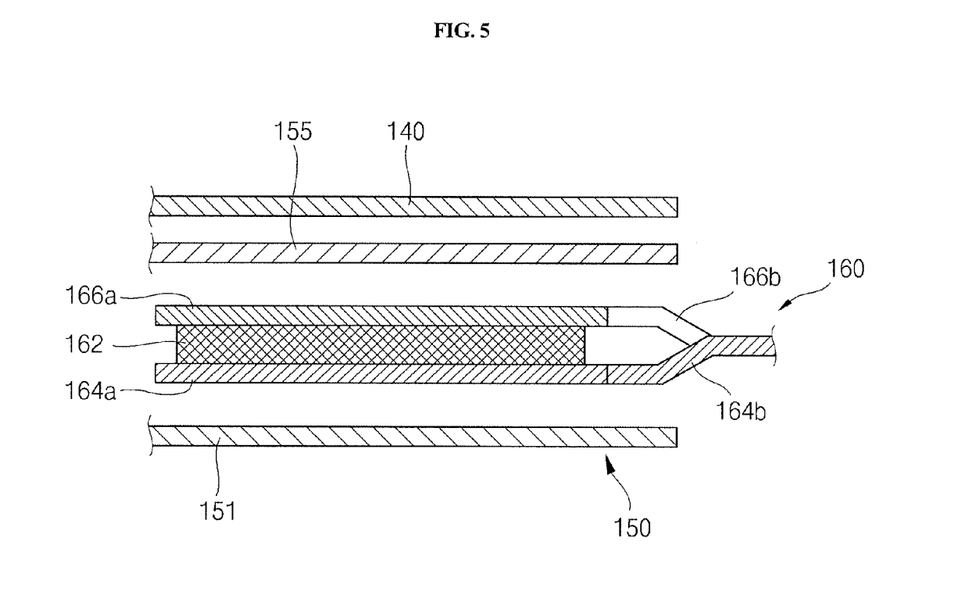
FIG. 5 is a cross-sectional view taken along the line A-A' of FIG. 3.

FIG. 1a is a perspective view of a battery pack in accordance with one embodiment of the present invention; FIG. 1b is an exploded perspective view of the battery pack shown in FIG. 1a; FIG. 2 is a bottom perspective view of a circuit module of the battery pack shown in FIG. 1b; FIG. 3 is a perspective view of a bare cell, a circuit module, a bop antenna and a PTC device of the battery pack shown in FIG. 1b; FIG. 4 is a perspective view of a PTC device shown in FIG. 3; and FIG. 5 is a cross-sectional view taken along the line A-A' of FIG. 3.

Referring to FIGS. 1a, 1b and 2, a battery pack 100 in accordance with one embodiment of the present invention includes a bare cell 110, a circuit module 120, a first lead plate 132, second lead plates 134, an electromagnetic shielding tape 140, a bop antenna 150 and a PTC device 160, an upper cover 170, a lower cover 180 and a label 190.

The bare cell 110 and the circuit module 120 are electrically connected through the first lead plate 132 and the second lead plates 134 to form a core pack. The upper cover 170 and the lower cover 180 are assembled into the core pack, followed by attachment of the label 190 to fabricate a battery pack 100.

The bare cell 110 supplies electrical energy, and includes an electrode assembly composed of a positive electrode, a negative electrode and a separator disposed therebetween; a container-type can 111 formed of a metal and housing the electrode assembly and an electrolyte; and a cap assembly 112 for sealing an open part of the can 111. The cap assembly 112 shown in FIG. 1b includes a cap plate 113 formed of metal, an electrode terminal 114 formed protruding from the cap plate 113, and a gasket 115 disposed between the cap plate 113 and the electrode terminal 114 for insulating the electrode terminal 114 from the cap plate 113.

The can 111 and the cap plate 113 per se may serve as a terminal, and an embodiment of the present invention is illustrated for a structure where the can 111 and the cap plate 113 work as a positive electrode. Therefore, illustration will be given in which the electrode terminal 114 serves as a negative electrode. Further, an alternative embodiment is also possible where the can 111, the cap plate 113 and the electrode terminal 114 have polarities opposite to the polarities specified above.

The bare cell 110, as shown in FIG. 1b, includes an upper surface 110a with protrusion of the electrode terminal 114 being insulated by the gasket 115, a pair of short lateral sides 110b, 110c and a pair of long lateral sides 110d, 110e in connection with the upper surface 110a, and a lower surface 110f in connection with the lateral sides 110b, 110c, 110d, 110e and opposite to the upper surface 110a. The pair of short lateral sides 110b, 110c are generally narrow-width lateral sides in connection with the upper surface 110a of the bare cell 110, whereas the pair of long lateral sides 110d, 110e are wide-width lateral sides of the bare cell 110. Meanwhile, in an embodiment of the present invention, the upper surface 110a of the bare cell 110 is defined as facing an upward direction of the bare cell 110, whereas the lower surface 110f of the bare cell 110 is defined as facing a downward direction of the bare cell 110.

Referring to FIGS. 1b to 3, the circuit module 120 is disposed on an upper part of the bare cell 110 to thereby result in electrical connection with the bare cell 110, and includes a circuit board 121, an external terminal portion 122 and a welding hole 124. Further, the circuit module 120 further includes an antenna connection pad 127 and a PTC connection pad 128.

The circuit board 121 is formed of a resin plate, and includes a charge/discharge circuit pattern for providing a uniform charge state of the battery through control of charge and discharge thereof, or a protection circuit pattern for preventing overdischarge and overcharge of the battery. The circuit board 121 includes circuit elements 123 installed on a lower surface 121b to create a charge/discharge circuit pattern and a protection circuit pattern. In the context of embodiments of the present invention, the upper surface 121a of the circuit board 121 conforms to and defines an upper surface of the circuit module 120, and the lower surface 121b of the circuit board 121 conforms to and defines a lower surface of the circuit module 120.

The external terminal portion 122 is installed on the upper surface 121a of the circuit board 121, and provides electrical connection between the circuit board 121 and external electronic equipment. The external terminal portion 122 may include power terminals 122a, 122b, an antenna terminal 122c and an identification (ID) terminal 122d, each of which is formed of a metal.

The welding hole 124 is formed to extend through the upper surface 121a and the lower surface 121b of the circuit board 121. The welding hole 124 is positioned in a region corresponding to the electrode terminal 114 of the bare cell 110, thereby providing a welding space upon welding of the first lead plate 132 to the electrode terminal 114 of the bare cell 110 by resistance welding.

The antenna connection pad 127 is formed of a metal plate on one side of the lower surface 121b of the circuit board 121. The antenna connection pad 127 is in electrical connection with the antenna terminal 122c through a separate circuit pattern formed on the circuit board 121. Specifically, the antenna connection pad 127 includes a first antenna connection pad 127a and a second antenna connection pad 127b. The first antenna connection pad 127a and the second antenna connection pad 127b are in electrical connection with a first antenna lead plate 153 and a second antenna lead plate 154, respectively, of a loop antenna 150 which will be illustrated hereinafter. Accordingly, the antenna connection pad 127 provides electrical connection between the antenna terminal 122c and the bop antenna 150.

The PTC connection pad 128 is formed of a metal plate on the other side of the lower surface 121b of the circuit board 121. The PTC connection pad 128 is electrically connected to the power terminals 122a, 122b through a charge/discharge circuit pattern of the circuit board 121. Specifically, the PTC connection pad 128 may include a first PTC connection pad 128a and a second PTC connection pad 128b. The first PTC connection pad 128a and the second PTC connection pad 128b are in electrical connection with a first PTC lead plate 164 and a second PTC lead plate 166, respectively, of a PTC device 160 which will be described hereinafter. Accordingly, the PTC connection pad 128 provides electrical connection between the power terminals 122a, 122b and the PTC device 160.

The first lead plate 132 is installed to cover the welding hole 124 on the lower surface 121b of the circuit board 121, resulting in electrical connection with a negative electrode wiring pattern of the circuit module 120, and is electrically connected to the electrode terminal 114 through the welding hole 124 by resistance welding. The first lead plate 132 is formed of metal, for example, nickel or nickel alloy. The first lead plate 132 is connected to the electrode terminal 114, thus serving as a negative electrode together with the electrode terminal 114.

The second lead plates 134 are installed at respective ends of the lower surface 121b of the circuit board 121 to result in electrical connection with a positive electrode wiring pattern of the circuit module 120, and extend to connect with the upper surface 110a of the bare cell 110 to be electrically connected to the upper surface 110a of the bare cell 110. The second lead plates 134 are formed of a metal, for example, nickel or nickel alloy. The second lead plates 134 are connected to the upper surface 110a of the bare cell 110 so the second lead plates can act as a positive electrode.

The electromagnetic shielding tape 140 is connected to one side of the bare cell 110, for example, a long lateral side 110d. Specifically, the electromagnetic shielding tape 140 is disposed between the long lateral side 110d of the bare cell 110 and the bop antenna 150 which will be described hereinafter. The electromagnetic shielding tape 140 absorbs electromagnetic waves coming from the loop antenna 150, thus preventing adverse effects of electromagnetic waves of the loop antenna 150 on charge/discharge operation of the bare cell 110. For this purpose, a substrate of the electromagnetic shielding tape 140 is provided with a conductive pattern, such that electromagnetic waves of the loop antenna 150 can be grounded. In order to achieve effective shielding of electromagnetic waves of the loop antenna 150, the electromagnetic shielding tape 140 may be formed to have a width greater than at least the loop antenna 150 connected to the long lateral side 110d of the bare cell 110.

The loop antenna 150 is attached to one side of the bare cell 110. In one embodiment, the bop antenna 150 is attached to cover the electromagnetic shielding tape 140 attached to the long lateral side 110d of the bare cell 110. The loop antenna 150 is electrically connected to the antenna terminal 122c through the antenna connection pad 127 and a separate circuit pattern formed on the circuit board 121, which can result in electrical connection with external electronic equipment such as portable terminals. The loop antenna 150 is formed to generate induced electromotive force. Therefore, the loop antenna 150 can transmit a radio frequency (RF) received from other external electronic equipment (such as a card reader) to external electronic equipment to which the battery pack 100 is mounted, and can transmit transmission signals coming from the external electronic equipment with installation of the battery pack 100 to other external electronic equipment such as a card reader. Examples of radio frequencies may include broadcast frequency, e.g. digital multimedia broadcasting (DMB), radio-frequency identification (RFID) reading frequency, smart card scan frequency and equivalent frequency thereof.

Specifically, the loop antenna 150 may include a first coverlay 151, an antenna pattern 152, a first antenna lead plate 153, a second antenna lead plate 154 and a second coverlay 155. The loop antenna 150 may have a maximum thickness of from about 0.3 mm to about 0.5 mm.

The first coverlay 151 is formed in the form of a thin film of a plastic resin and serves to protect the antenna pattern 152 which will be illustrated hereinafter.

The antenna pattern 152 may be formed to extend along the edges of the first coverlay 151 so that an antenna line is wound several times on the first coverlay 151. The antenna pattern 152 can receive a radio frequency from the outside to thereby generate induced electromotive force in an electronic chip contained in external electronic equipment with installation of the battery pack 100, and transmit transmission signals coming from the electronic chip.

The first antenna lead plate 153 and the second antenna lead plate 154 are connected to respective ends of the antenna pattern 152, and extend to contact the first and second antenna connection pads 127a, 127b of the circuit module 120. The first antenna lead plate 153 and the second antenna lead plate 154 provide electrical connection between the antenna pattern 152 and the external electronic equipment with installation of the battery pack 100, thereby allowing for communication between the external electronic equipment with installation of the battery pack 100 and the other external electronic equipment. Here, the first antenna lead plate 153 and the second antenna lead plate 154 may be formed of metal.

Specifically, the first antenna lead plate 153 includes a first base portion 153a connected to one end of the antenna pattern 152, and a first extension portion 153b bending and extending from the first base portion 153a and connected to the first antenna connection pad 127a.

Similarly, the second antenna lead plate 154 includes a second base portion 154a connected to the other end of the antenna pattern 152, and a second extension portion 154b bending and extending from the second base portion 154a and connected to the second antenna connection pad 127b.

The second coverlay 155 is formed in the form of a thin film of a plastic resin, and covers the antenna pattern 152 to combine with the first coverlay 151 and is opposite to one side of the bare cell 110. The second coverlay 155, in conjunction with the first coverlay 151, protects the antenna pattern 152.

The PTC device 160 is disposed on one side of the loop antenna 150. In one embodiment, the PTC device 160 is disposed on the outside of the antenna pattern 152, between the first coverlay 151 and the second coverlay 155 of the loop antenna 150, and is electrically connected to a charge/discharge circuit pattern of the circuit module 120. The PTC device 160 can prevent the rupture of the battery pack 100 due to excessive heat generation through interruption of a flow of electrical current when the battery pack 100 undergoes heat generation and rises to a high temperature beyond the preset temperature due to, for example, a flow of overcurrent or overvoltage.

Specifically, referring to FIGS. 3 to 5, the PTC device 160 may include a PTC body 162, a first PTC lead plate 164 and a second PTC lead plate 166. The PTC device 160 may have a maximum thickness of from about 0.5 mm to about 0.7 mm.

The PTC body 162 is interposed between the first coverlay 151 and the second coverlay 155 of the loop antenna 150, and is fabricated by dispersing conductive particles in a crystalline polymer. The PTC body 162 is a device which reaches almost an infinite electrical resistance when a temperature exceeds a certain critical value so it can interrupt charge/discharge current when the battery pack 100 is exposed to abnormally high temperature conditions. Since the PTC body 162 performs a reversible operation, it allows again for a flow of charge/discharge current when the temperature of the battery pack 100 drops below the critical value. Accordingly, the PTC body 162 can serve as a safety device for prevention of the rupture of the battery pack 100 due to the occurrence of excessive heat generation.

The first PTC lead plate 164 is connected to one surface of the PTC body 162 and extends to connect with the first PTC connection pad 128a of the circuit module 120. A portion of the first FTC lead plate 164 is disposed between the first coverlay 151 and the second coverlay 155 of the bop antenna 150.

Specifically, the first PTC lead plate 164 may include a first contact portion 164a in contact with one surface of the PTC body 162, a first connection portion 164b bending and extending from the first contact portion 164a, and a first extension portion 164c bending and extending from the first connection portion 164b and in contact with the first PTC connection pad 128a of the circuit module 120.

The second PTC lead plate 166 is connected to another surface of the PTC body 162 and extends to connect with the second PTC connection pad 128b of the circuit module 120. A portion of the second PTC lead plate 166 is disposed between the first coverlay 151 and the second coverlay 155 of the bop antenna 150.

Specifically, the second PTC lead plate 166 may include a second contact portion 166a in contact with another surface of PTC body 162, a second connection portion 166b bending and extending from the second contact portion 166a, and a second extension portion 166c bending and extending horn the second connection portion 166b and in contact with the second PTC connection pad 128b of the circuit module 120.

The first PTC lead plate 164 and the second PTC lead plate 166 provide electrical connection between the PTC body 162 and a charge/discharge circuit pattern (not shown) of the circuit board 121, such that the PTC body 162 can interrupt a flow of electric current when the PTC body 162 exceeds the critical temperature due to the occurrence of overcurrent or overvoltage upon charge/discharge of the battery pack 100. The first PTC lead plate 164 and the second PTC lead plate 166 may be formed of metal.

Hereinafter, the connection relationship will be illustrated between the bare cell 110, the circuit module 120, the loop antenna 150 and the PTC device 160 as configured above.

Referring to FIG. 3, the loop antenna 150 with disposition of the PTC device 160 on one side thereof is connected to one side of the bare cell 110, and the loop antenna 150 and the PTC device 160 are in electrical connection with the circuit module 120. Accordingly, as compared to conventional installation of the PTC device in the circuit module, a larger installation space for mounting of circuit elements 123 can be secured in the circuit module 120, and the number of circuit pattern layers inside the circuit board 121 can also be reduced because the mounting space of the circuit elements 123 is secured in the circuit module 120.

Further, the PTC device 160 is installed in a portion of the bop antenna 150, e.g. in a region which does not overlap with the antenna pattern 152, between the first coverlay 151 and the second coverlay 155. Accordingly, it is possible to minimize or reduce design constraints associated with the thickness and width of the battery pack 100 to which the loop antenna 150 is applied.

Further, the PTC device 160 is positioned on one side of the bare cell 110, and is therefore operated by direct effects of heat generation of the bare cell 110 when the battery pack 100 is exposed to overcharge or overcurrent conditions. As a result, operation reliability of the PTC device 160 can be enhanced, and therefore reliability for prevention of the rupture of the battery pack 100 can be improved.

The upper cover 170 is connected to an upper part of the bare cell 110 and houses the circuit module 120 in an internal space thereof. The upper cover 170 may include a cover plate 171 and a side wall 174 extending from the cover plate 171 toward the circuit module 120.

The cover plate 171 may be formed to generally conform to the shape of the upper surface 110a of the bare cell 110. An internal surface of the cover plate 171 is in contact with the upper surface 121a of the circuit board 121. The cover plate 171 includes a through-hole 175 formed in the region corresponding to the external terminal portion 122. The through-hole 175 exposes the external terminal portion 122 to the outside of the battery pack 100, which allows for electrical connection between the battery pack 100 and external electronic equipment (not shown).

The side wall 174 includes two ends 172 of the upper cover 170, and a connection portion 173 between the ends 172. The ends 172 are in contact with regions corresponding to the short lateral sides 110b, 110c out of the upper surface 110a of the bare cell 110 and support the upper cover 170. The connection portion 173 extends further toward the circuit module 120 than the ends 172. A region of the connection portion 173 covering an upper part of a pair of long lateral sides 110d, 110e of the bare cell 110 is enclosed by a label 190 which will be illustrated hereinafter.

The lower cover 180 is attached to a lower part of the bare cell 110. The lower cover 180 may include a bottom plate 181, and extension portions 182 extending from the bottom plate 181 toward the bare cell 110.

The bottom plate 181 generally conforms to the lower surface 110f of the bare cell 110, and is attached to the lower surface 110f of the bare cell 110 by an adhesive member 185.

The extension portions 182 cover lower parts of the long lateral sides 110d, 110e of the bare cell 110. The extension portions 182 are enclosed by a label 190 which will be illustrated hereinafter.

The label 190 is attached to enclose the lateral sides 110b, 110c, 110d, 110e of the bare cell 110. The label 190 covers a portion of the connection portion 173 of the upper cover 170 and the extension portion 182 of the lower cover 180.

As such, the battery pack 100 in accordance with one embodiment of the present invention is fabricated with positioning of the PTC device 160 on one side of the loop antenna 150 connected to one side of the bare cell 110. As compared to conventional installation of the PTC device in the circuit module, the aforementioned configuration allows securing a mounting space of circuit elements 123 in the circuit module 120 and it is also possible to minimize or reduce the number of circuit pattern layers inside the circuit board 121 because the mounting space of the circuit elements 123 is secured.

Further, the battery pack 100 in accordance with one embodiment of the present invention is configured such that the PTC device 160 is installed in a portion of the loop antenna 150, e.g. in a region which does not overlap with the antenna pattern 152 between the first coverlay 151 and the second coverlay 155 of the loop antenna 150. Accordingly, it is possible to minimize or reduce design constraints associated with the thickness and width of the battery pack 100 when a loop antenna is applied.

Further, the battery pack 100 in accordance with one embodiment of the present invention can be configured such that the PTC device 160 is positioned on one side of the bare cell 110, and is therefore operated by direct effects of heat generation of the bare cell 110 when the battery pack 100 is exposed to overcharge or overcurrent conditions. As a result, the battery pack 100 in accordance with one embodiment of the present invention enhances operation reliability of the PTC device 160, and therefore reliability for prevention of the rupture of the battery pack 100 can be improved.

Hereinafter, a battery pack 200 in accordance with another embodiment of the present invention will be illustrated.

The configuration of the battery pack 200 except for an electromagnetic shielding tape 240 is identical to that of the battery pack 100 in accordance with the previous embodiment of the present invention, so details thereof will be omitted herein. Like reference numerals refer to like elements throughout the specification and drawings. The following is given to address the configuration of the electromagnetic shielding tape 240.

Figure 6A:
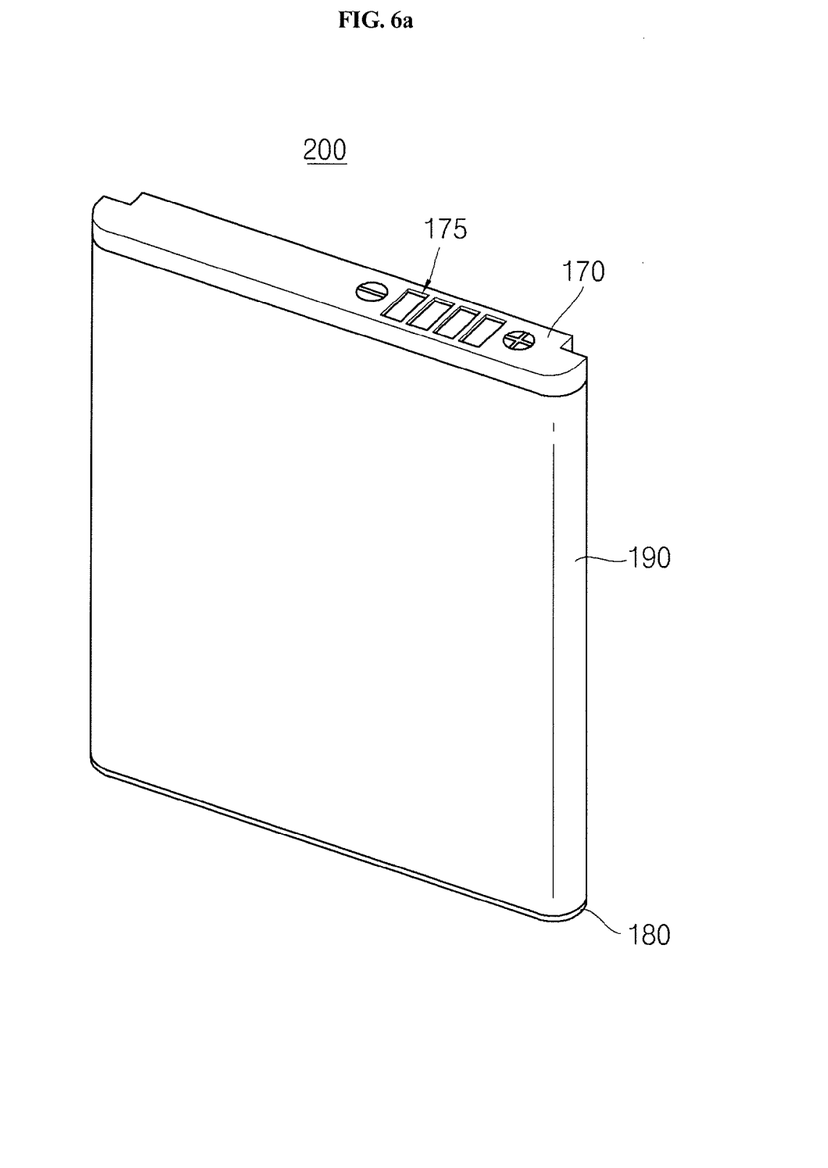
FIG. 6a is a perspective view of a battery pack in accordance with another embodiment of the present invention.
Figure 6B:
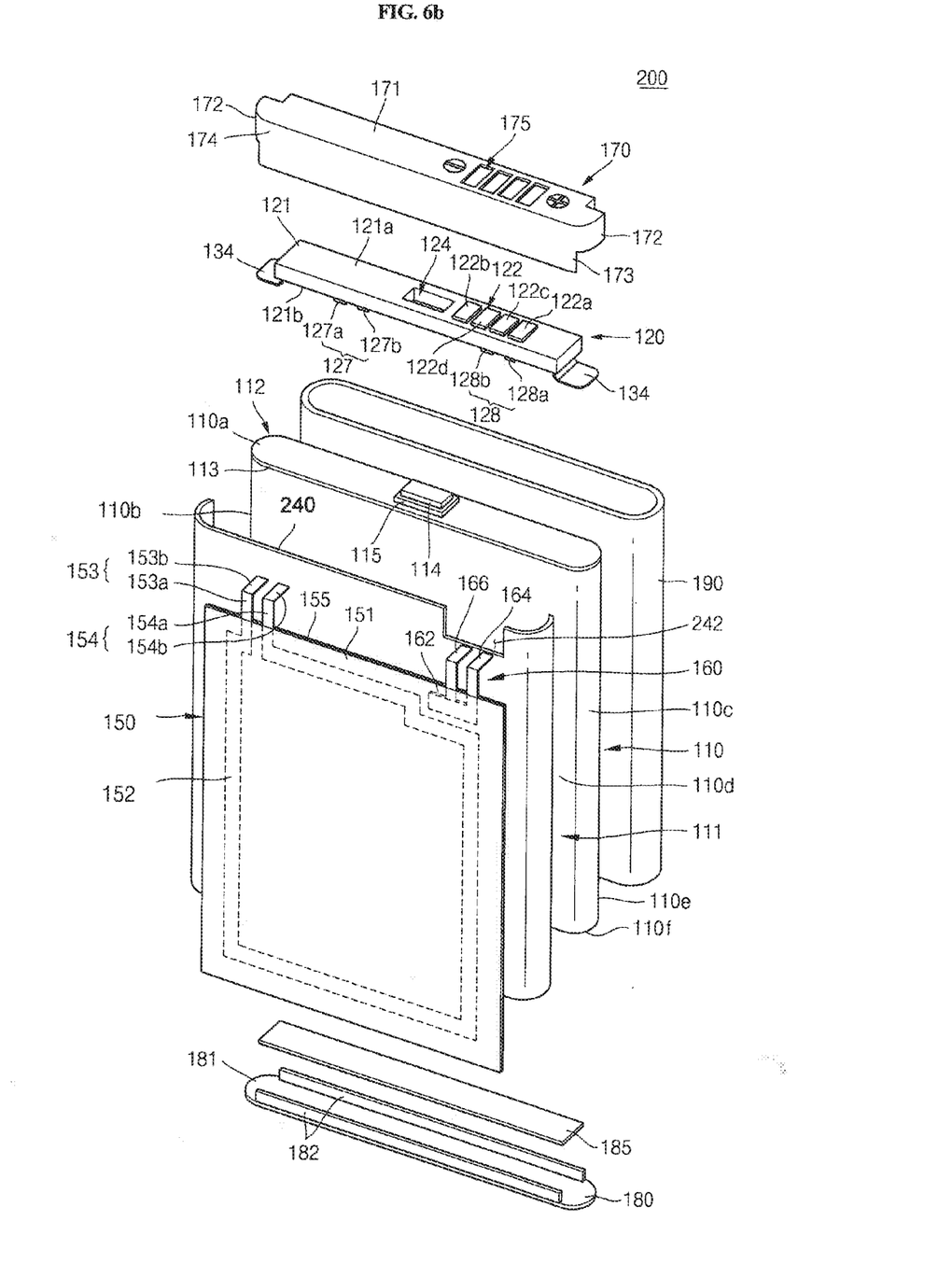
Figure 7:
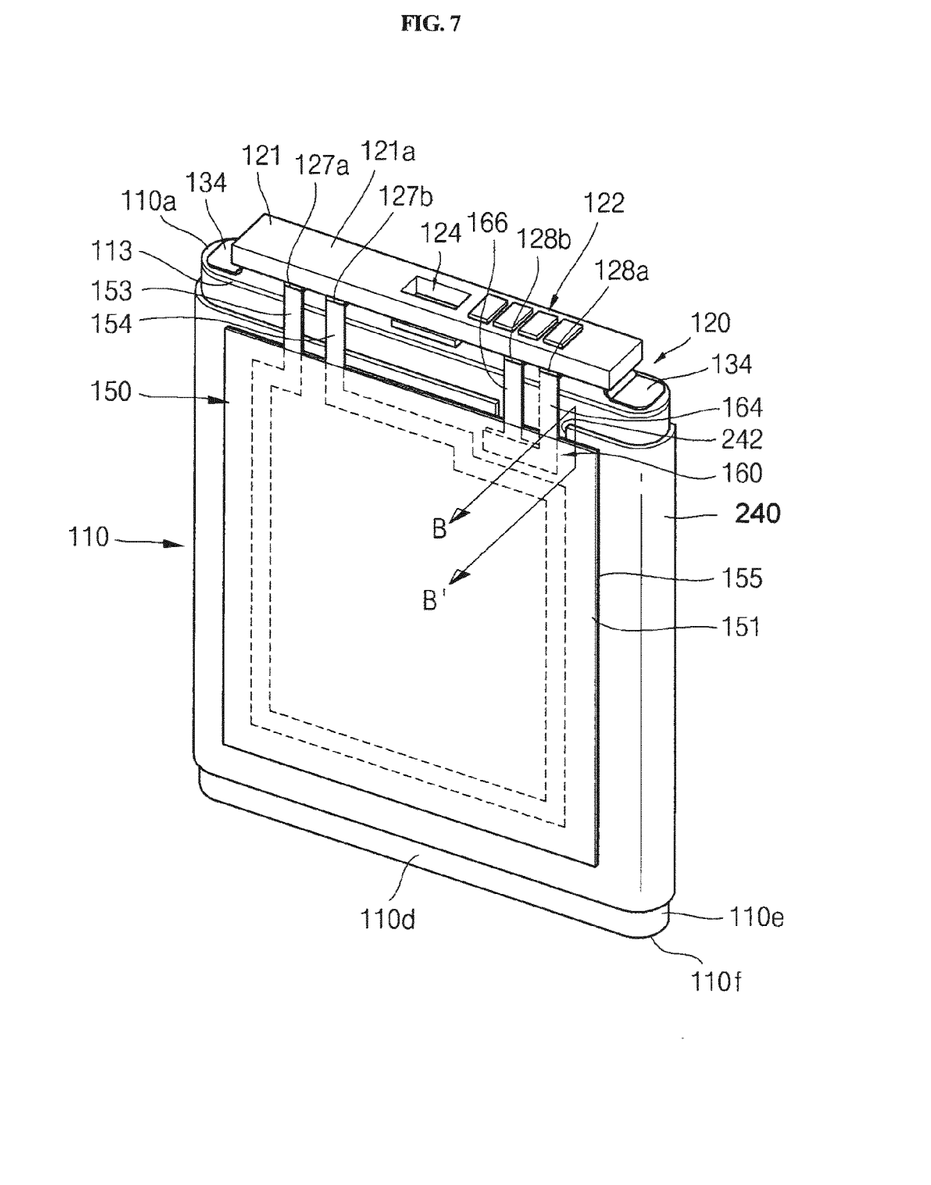
FIG. 7 is a perspective view of a bare cell, a circuit module, a loop antenna and a FTC device of the battery pack shown in FIG. 6b.
Figure 8:
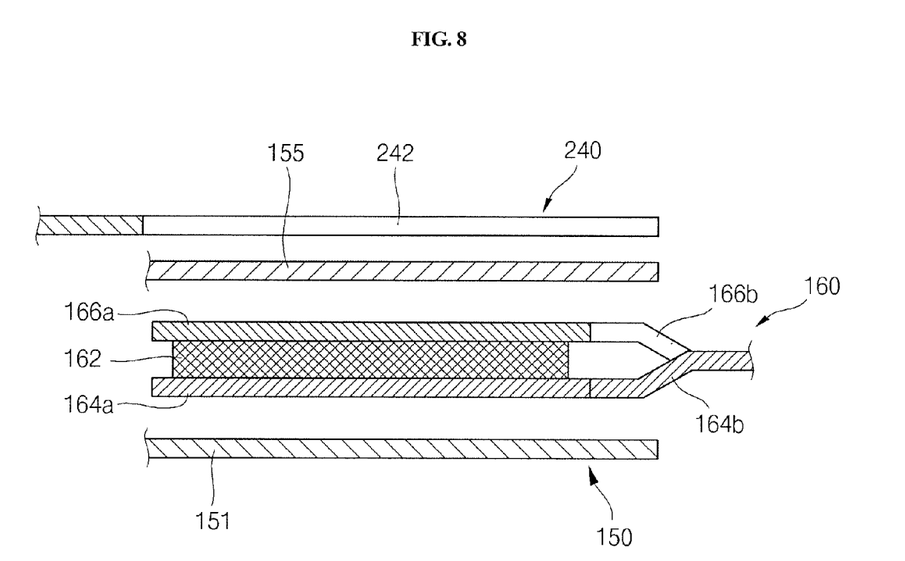
FIG. 8 is a cross-sectional view taken along the line B-B' of FIG. 7.
Figure 9:
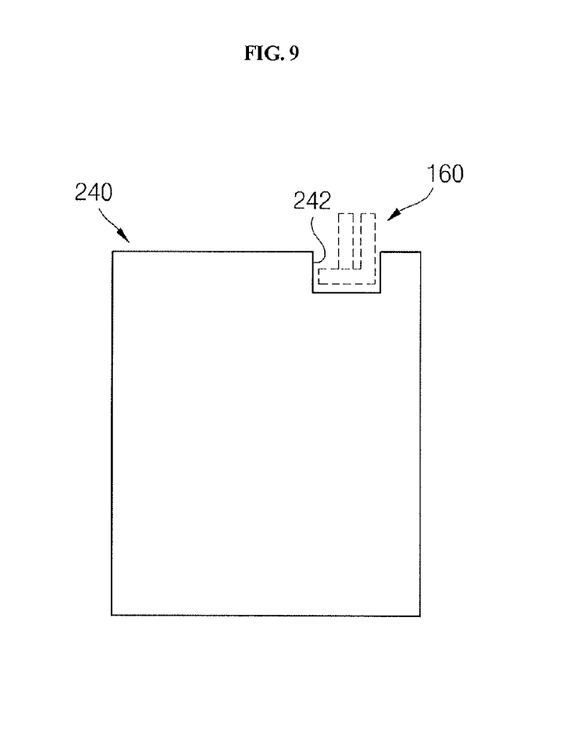
FIG. 9 is a plan view of an electromagnetic shielding tape connected to a PTC device of the battery pack shown in FIG. 7.

FIG. 6a is a perspective view of a battery pack in accordance with another embodiment of the present invention. FIG. 6b is an exploded perspective view of the battery pack shown in FIG. 6a. FIG. 7 is a perspective view of a bare cell, a circuit module, a bop antenna and a PTC device of the battery pack shown in FIG. 6b. FIG. 8 is a cross-sectional view taken along the line B-B' of FIG. 7. FIG. 9 is a plan view of an electromagnetic shielding tape connected to a PTC device of the battery pack shown in FIG. 7.

Referring to FIGS. 6a, 6b, 7 and 8, the battery pack 200 in one embodiment includes a bare cell 110, a circuit module 120, a first lead plate 132, second lead plates 134, an electromagnetic shielding tape 240, a loop antenna 150 and a PTC device 160, an upper cover 170, a lower cover 180 and a label 190.

Referring to FIG. 6a and FIG. 9, the material, attachment site and function of the electromagnetic shielding tape 240 are substantially similar to those of the electromagnetic shielding tape 140 shown in FIG. 1b. Unlike the tape 140, the electromagnetic shielding tape 240 further includes a receiving groove 242 formed in a region generally corresponding to the PTC device 160. The electromagnetic shielding tape 240 is provided to ensure that the PTC device 160 can be housed in the receiving groove 242, when the bop antenna 150 having the PTC device 160 positioned thereon is connected to one side of the bare cell 110, e.g. the long lateral side 110d. Accordingly, the electromagnetic shielding tape 240 can reduce a thickness of the battery pack 200 as compared to a conventional battery pack.

As described above, the battery pack 200 is configured in a manner that the PTC device 160 connected to one side of the loop antenna 150 is housed in the receiving groove 242 of the electromagnetic shielding tape 240, thereby resulting in reduction of a thickness of the battery pack 200 due to the PTC device 160 compared to a conventional device. As a consequence, when the loop antenna 150 is applied, it is possible to further minimize constraints of the thickness, as compared to the battery pack 100 in accordance with the previous embodiment of the present invention.

As apparent from the above description, a battery pack in accordance with embodiments of the present invention is fabricated with positioning of a PTC device on one side of a bop antenna attached to one side of a bare cell. Therefore, as compared to conventional installation of the PTC device in the circuit module, the aforementioned configuration allows securing a larger mounting space of circuit elements in the circuit module and it is also possible to minimize the number of circuit pattern layers inside the circuit board, due to securing of the mounting space for the circuit elements.

Further, the battery pack in accordance with embodiments of the present invention is configured such that the PTC device is installed in a portion of the loop antenna, e.g. in a region which does not overlap with an antenna pattern, between the first coverlay and the second coverlay of the loop antenna. Accordingly, it is possible to minimize or reduce design constraints associated with thickness and width of the battery pack when it is desired to incorporate a bop antenna.

Further, due to the installation of the PTC device on one side of the bare cell, the PTC device can be operated directly in response to heat generation of the bare cell when the battery pack is in overcharge or overcurrent conditions. As a result, the battery pack in accordance with embodiments of the present invention enhances operation reliability of the PTC device, thereby improving reliability for preventing the rupture of the battery pack.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery pack comprising:
   a bare cell comprising a first surface and an electrode terminal protruding from the first surface;
   a circuit module on the first surface of the bare cell and electrically connected to the bare cell;
   a loop antenna attached to a lateral side of the bare cell adjacent the first surface, the loop antenna electrically connected to the circuit module and comprising an antenna pattern and first and second antenna lead plates connecting the antenna pattern to the circuit module; and
   a PTC device comprising a PTC body on the lateral side of the bare cell and spaced apart from the antenna pattern and the first and second antenna lead plates, the PTC device electrically connected to the circuit module.

2. The battery pack according to claim 1, wherein the loop antenna comprises:
   a first coverlay;
   the antenna pattern extending along edges of the first coverlay; and
   a second coverlay covering the antenna pattern, connected to the first coverlay and attached to the lateral side of the bare cell.

3. The battery pack according to claim 2, wherein the first antenna lead plate includes a first base portion connected to a first end of the antenna pattern and a first extension portion extending at an angle from the first base portion, and
   wherein the second antenna lead plate includes a second base portion connected to a second end of the antenna pattern and a second extension portion extending at an angle from the second base portion.

4. The battery pack according to claim 3, wherein the PTC device comprises conductive particles dispersed in a crystalline polymer, and wherein the PTC device includes:
   the PTC body between the first coverlay and the second coverlay;
   a first PTC lead plate connected to a first surface of the PTC body; and
   a second PTC lead plate connected to a second surface of the PTC body.

5. The battery pack according to claim 4, wherein the first PTC lead plate includes a first contact portion in contact with a first surface of the PTC body, a first connection portion extending from the first contact portion, and a first extension portion extending at an angle from the first connection portion, and wherein the second PTC lead plate includes a second contact portion in contact with a second surface of the PTC body, a second connection portion extending from the second contact portion, and a second extension portion extending at an angle from the second connection portion.

6. The battery pack according to claim 5, wherein the circuit module includes an antenna connection pad and a PTC connection pad on a lower surface of the circuit module, wherein the antenna connection pad comprises a first antenna connection pad and a second antenna connection pad connected to the first extension portion of the first antenna lead plate and to the second extension portion of the second antenna lead plate, respectively, and wherein the PTC connection pad comprises a first PTC connection pad and a second PTC connection pad connected to the first extension portion of the first PTC lead plate and to the second extension portion of the second PTC lead plate, respectively.

7. The battery pack according to claim 2, wherein the PTC device is between the first coverlay and the second coverlay.

8. The battery pack according to claim 2, wherein the PTC device is on an outside of the antenna pattern.

9. The battery pack according to claim 1, wherein the circuit module includes an external terminal portion, and wherein the external terminal portion includes a power terminal electrically connected to the PTC device and an antenna terminal electrically connected to the loop antenna.

10. A battery pack comprising:
a bare cell;
a circuit module on the bare cell and electrically connected to the bare cell;
a loop antenna attached to the bare cell and electrically connected to the circuit module; and
a PTC device on the loop antenna and electrically connected to the circuit module, wherein the loop antenna comprises:
a first coverlay;
an antenna pattern extending along edges of the first coverlay;
a first antenna lead plate and a second antenna lead plate connected to the antenna pattern; and
a second coverlay covering the antenna pattern, connected to the first overlay and attached to one side of the bare cell, and
wherein the battery pack further comprises an electromagnetic shielding tape between the bare cell and the second coverlay.

11. The battery pack according to claim 10, wherein the electromagnetic shielding tape includes a receiving groove generally corresponding to the PTC device.

* * * * *

UNITED STATES PATENT AND TRADEMARK OFFICE
CERTIFICATE OF CORRECTION

| | | |
|---|---|---|
| PATENT NO. | : 8,652,667 B2 | Page 1 of 1 |
| APPLICATION NO. | : 12/633573 | |
| DATED | : February 18, 2014 | |
| INVENTOR(S) | : Heongsin Kim et al. | |

It is certified that error appears in the above-identified patent and that said Letters Patent is hereby corrected as shown below:

In the Claims

Column 12, Claim 10, line 20    Delete "overlay"

Insert -- coverlay --

Signed and Sealed this
First Day of September, 2015

Michelle K. Lee
*Director of the United States Patent and Trademark Office*